United States Patent Office 3,219,586
Patented Nov. 23, 1965

3,219,586
REMOVING NICKEL FROM CRACKING CATALYST
Henry Erickson, Park Forest, Ill., assignor to Sinclair Research, Inc., Wilmington, Del., a corporation of Delaware
No Drawing. Filed Sept. 25, 1961, Ser. No. 140,197
6 Claims. (Cl. 252—415)

This invention concerns the removal of nickel from a synthetic gel hydrocarbon conversion catalyst which has been contaminated with nickel by use in the high temperature catalytic conversion of feedstocks containing such metal.

The method comprises removing the cataylst containing metal contaminants from the hydrocarbon conversion system, treating the catalyst with hydrogen at an elevated temperature, converting nickel to water soluble or dispersible chlorides by contact of the catalyst, after hydrogenation, with a vaporous chlorinating agent, removing the chloride and conducting the catalyst to a conversion system. The invention may be used alone or as part of an overall metals-removal procedure employing a plurality of processing steps to increase the amount of nickel contaminant removed by the process.

Catalytically promoted methods for the chemical conversion of hydrocarbons include cracking, hydrocracking, reforming, hydroforming, etc. Such reactions generally are performed at elevated temperatures, for example, about 300–1200° F., more often 600 to 1000° F. Feedstocks to these processes comprise normally liquid and solid hydrocarbons which at the temperature of the conversion reaction are generally in the fluid, i.e., liquid or vapor, state and the products of the conversion frequently are lower-boiling materials. In particular, cracking of heavier hydrocarbon feedstocks to produce hydrocarbons of preferred octane rating, boiling in the gasoline range, is widely practiced and uses a variety of solid oxide catalysts to give end products of fairly uniform composition. Cracking is ordinarily effected to produce gasoline as the most valuable product and is generally conducted at temperatures of about 750 to 1100° F., preferably about 850 to 950° F., at pressures up to about 200 p.s.i.g., preferably about atmospheric to 100 p.s.i.g., and without substantial addition of free hydrogen to the system. In cracking, the feedstock is usually a mineral oil or petroleum hydrocarbon fraction such as straight run or recycle gas oils or other normally liquid hydrocarbons boiling above the gasoline range.

In this invention, the mineral hydrocarbon oils utilized as feedstock for a conversion process may be of any desired type normally utilized in catalytic conversion operations. This feedstock contains nickel metal contaminants and the catalyst may be used as a fixed, moving or fluidized bed or may be in a more dispersed state. In the conversion system, the catalyst may be regenerated by contact with oxygen-containing gas intermittently or continuously as desired in order to restore or maintain the activity of the catalyst by removing carbon. For typical operations, the catalytic cracking of the hydrocarbon feed would normally result in a conversion of about 50–60 percent of the feedstock into a product boiling in the gasoline boiling range.

One of the most important phases of the study in the improvement of catalyst performance in hydrocarbon conversion is in the area of metals posioning. Various petroleum stocks have been known to contain at least traces of many metals. In addition to metals naturally present, including some iron, petroleum stocks have a tendency to pick up tramp iron from transportation, storage and processing equipment. Most of these metals, when present in a stock, deposit as a non-volatile compound on the catalyst during the conversion processes so that regeneration of the catalyst to remove coke does not remove these contaminants. Although referred to as "metals," the contaminants may be in the form of free metals or non-volatile metal compounds. It is to be understood that the term "metal" used herein refers to either form.

Of the various metals which are to be found in representative hydrocarbon feedstocks some, like the alkali metals, only deactivate the catalyst without changing the product distribution; therefore they might be considered true poisons. Others such as iron, nickel, vanadium, and copper usually markedly alter the character and pattern of cracking reactions, generally producing a higher yield of coke and hydrogen at the expense of desired products, such as gasoline and butanes. For instance, it has been shown that the yield of gasoline, based on cracking feed disappearance to lighter materials, dropped from 93 to 82% when the laboratory-measured coke factor of a catalyst used in commercial cracking of a feedstock containing some highly contaminated marginal stocks rose from 1.0 to 3.0. This decreased gasoline yield was matched by an increase in gas as well as coke. If a poison is broadly defined as anything that deactivates or alters the reactions promoted by a catalyst then all of the four metals mentioned above can be considered poisons. It is hypothesized that when present on the surface of a catalyst, Fe, Ni, V and Cu superimpose their dehydrogenation activity on the desired reactions and convert into carbonaceous residue and gas some of the material that would ordinarily go into more valuable products. The relatively high content of hydrogen in the gases formed by metals-contaminated catalysts is evidence that dehydrogenation is being favored. This unwanted activity is especially great when nickel and vanadium are present in the feedstocks.

Metal poisoning of cracking catalysts is a major cost item in present-day refining and is a bottleneck in upgrading residual stocks. Current methods of combatting metal poisoning are careful preparation of feedstocks to keep the metals content low and catalyst replacement to control metals levels on the catalyst. An alternate solution, demetallizing the catalyst which would avoid discarding of expensive catalyst, and enable much lower grade, highly metals-contaminated feedstocks to be used, is now possible.

Solid oxide catalysts, both naturally occurring activated clays and synthetically prepared gel catalysts, as well as mixtures of the two types, have long been recognized as useful in catalytically promoting conversion of hydrocarbons. A popular "natural" catalyst is "Filtrol" which is acid-activated montmorillonite. Active synthetic catalysts are generally gels or gelatinous precipitates and include alumina-based as well as silica-based materials. For cracking processes, the catalysts which have received the widest acceptance today are usually activated or calcined predominantly silica or silica-based compositions in a state of very slight hydration and containing acidic oxide promoters in many instances. Such materials include silica-alumina, silica-zirconia, etc. as well as ternary combinations such as silica-alumina-zirconia, etc. Ordinarily, this type of catalyst contains silica and at least one other material, such as alumina, zirconia, etc. These oxides may also contain small amounts of other materials, but current practice in catalytic cracking leans more toward the exclusion of foreign materials from the silica hydrate materials. The presence of foreign materials, such as alkaline salts, in the catalyst may cause sintering of the catalyst surface on regeneration to remove coke, and a drop in catalytic activity. For this reason, the use of synthetic catalysts, which are more uniform and less damaged by high temperatures in treatment and regeneration, is often preferable. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalyst may be a semi-synthetic material such as made by precipitation of silica-alumina on a kaolinite or halloysite or an activated clay. One example of such catalysts contains about equal amounts of silica-alumina and clay.

The production of synthetic catalysts can be performed, for instance, (1) by impregnating silica with aluminum salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by the combination of hydrated silica with other hydrate bases as, for instance, zirconia, etc. These synthetic gel type catalysts are activated or calcined before use.

Commercially used cracking catalysts are the result of years of study and research into the nature of cracking catalysis, and the cost of these catalysts is not negligible. The cost frequently makes highly poisoned feedstocks less desirable to use in cracking operations, even though they may be in plentiful supply, because of their tendency to damage the expensive catalysts. The expense of such catalysts, however, is justified because the composition, structure, porosity and other characteristics of such catalysts are rigidly controlled so that they may give optimum results in cracking. It is important, therefore, that removing poisoning metals from the catalyst does not jeopardize the desired chemical and physical constitution of the catalyst. Although methods have been suggested in the past for removing poisoning metals from a catalyst which has been used for high-tempertaure hydrocarbon conversions, for example, the processes of U.S. Patents 2,488,718, 2,488,744, 2,668,798 and 2,693,455, the severity of prior art demetallizing conditions has been criticized in U.S. Patent No. 2,901,419. This latter patent, along with a number of other patents seeks to solve the problem of metal poisoned catalysts by adding inhibiting or masking materials to the poisoned catalyst. There is a limit, of course, to just how much of such materials may be allowed to accumulate on a catalyst. However, the process of this invention is effective to remove nickel without endangering the expensive catalyst. This process may be used as an adjunct to demetallization procedures designed for vanadium or other metal contaminants removal and which form the subject matter of copending applications Serial Nos. 763,834, filed September 29, 1958; 842,618, filed September 28, 1959; 849,199, filed October 28, 1959; and 19,313, filed April 1, 1960, all of which are now abandoned. When increased amounts of nickel contaminant removal are desired the process of this invention is ideally suited as a supplement to the vanadium removal methods.

This invention makes use of hydrogenation procedures at an elevated temperature of about 1000–1600° F., wherein the catalyst composition and structure is not unduly harmed and a chlorination procedure at a moderate temperature up to about 700° F. or even up to about 900 or 1000° F., wherein, again, the catalyst composition and structure is not unduly harmed by the treatment and a substantial amount of the nickel content is converted to chlorides. The chlorination is generally followed by a liquid aqueous wash for the removal of nickel chlorides.

The amount of nickel removed by the process of the invention may be varied by the proper choice of treating conditions. It may prove desirable to repeat one or more modifications of the treatment to reduce the metals to an acceptable level and to give the catalyst an activity profile more comparable to that of a virgin, unpoisoned catalyst. A significant advantage of the process lies in the fact that the overall metals removal operation, even if repeated, does not unduly deleteriously affect the activity, selectivity, porosity, and other desirable characteristics of the catalyst.

The catalyst to be treated may be removed from the hydrocarbon conversion system—that is, the stream of catalyst which in most conventional procedures is cycled between conversion and regeneration operations—before the nickel content reaches about 5000 to 10,000 or 20,000 or more p.p.m., the poisoning metal being calculated as the common oxide. Catalyst demetallization is usually not economically justified unless the catalyst contains at least about 50 or 100 p.p.m. nickel oxide; preferably the metals level is allowed to exceed about 250 p.p.m. nickel oxide so that total metals removal will be greater per pass through the demetallizer. The process of this invention includes removing a metal poisoned silica-based catalyst from contact with a metal-contaminated hydrocarbon feedstock in a conversion zone at elevated temperature and, usually, regenerating the catalyst to remove carbon by contact with a combustion supporting gas. Then the catalyst is hydrogenated.

As pointed out, treatment of the catalyst with hydrogen takes place at a temperature of about 1000–1600° F., preferably at about 1200–1400° F., the choice of treating conditions depending upon the extent of metal poisoning and the stability of the catalyst toward high temperatures. The pressure of the hydrogenation system may be from atmospheric pressure or less up to about 1000 p.s.i.g. and preferably up to about 15 p.s.i.g.

The hydrogenating vapor contains about 10 to 100% free hydrogen; the rest may be any inert gas such as nitrogen. Preferably the hydrogenating vapor is anhydrous, that is, no separate aqueous phase appears if the vapor is converted to the liquid state. The hydrogenation appears to cause nickel in the catalyst to come to the surface; the hydrogenation, therefore, is continued for a time sufficient to bring about an increase in the removal of nickel in subsequent steps over the amount which would be removed had the hydrogenation not been performed. The treatment may take up to about 24 or more hours, more likely about 1–6 hours.

The removal of nickel from the catalyst may be accomplished by chlorinating the catalyst after hydrogenation and prior to an aqueous wash. The chlorination is performed by contact of the poisoned catalyst with chlorinating vapors at a temperature up to about 1000° F., preferably about 550–650° F. The chlorination, even when conducted in lower ranges, e.g. below about 550° F. may be effective for conversion of nickel to nickel chloride. The chlorinating agent is preferably anhydrous. The contact with chlorine may be at atmospheric pressure, or below or above. Subatmospheric pressures may be achieved by the use of vacuum or preferably, by dilution with an inert gas such as nitrogen. Generally at whatever pressure is used, at least about 0.5 or 1 weight percent chlorine, based on the catalyst is employed. The upper limit is based on economics; generally no more than about 10% chlorine is necessary, but 25% or more could be used. The time of contact, of course, depends on the amount of chlorine supplied per unit time and is sufficient to give conversion of substantial nickel to nickel chloride. 15 minutes to 2 hours is a practical time range but the chlorination may be accomplished in 5 minutes in some instances or may take 5 or more hours in others. The contact with chlorine may be followed by a purge with an inert gas such as nitrogen to remove entrained chlorine.

In this invention, it has been found that molecular chlorine vapors are in themselves sufficient to chlorinate the catalysts for subsequent removal of nickel poison. The chlorination practiced in the instant process is distinguishable from that where a chlorination promoter is generally used although such methods, if desired, could be used. Suitable reagents for such methods preferably are the chlorine-substituted light hydrocarbons, such as carbon tetrachloride, which may be used as such or formed in situ by the use of, for example, a vaporous mixture of chlorine gas with low molecular weight hydrocarbons such as methane, n-pentane, etc. Molecular chlorine is considerably less expensive than, for instance, carbon tetrachloride and a gaseous mixture of the two is a satisfactory chlorinating reagent.

Work using thionyl chloride carried by nitrogen gas as the chlorinating reagent has been done with comparable results to those using $CCl_4$. In addition, sulfur monochloride, with or without elemental chlorine, appears to be advantageous for use as a chlorinating reagent, sulfur monochloride being considerably less expensive than $CCl_4$. Sulfur dichloride also shows advantageous properties, since it may be supplied as a liquid to the chlorination procedure and upon vaporization will give a mixture of sulfur monochloride and chlorine. Other chlorinating agents may be used such as sulfuryl chloride, mixtures of hydrogen sulfide and chlorine, etc.

The stoichiometric amount of chlorine required to convert nickel to its most highly chlorinated compound is the minimum amount of chlorine ordinarily used and may be free chlorine, combined chlorine or a mixture of chlorine with the chlorine compound promoters described above. However, since the stoichiometric amount of chlorine frequently is in a neighborhood of only 0.001 g./g. of catalysts, a much larger amount of chlorine, say about 0.5–25 percent active chlorinating agent based on the weight of the catalyst is used in the practice of the invention. The amount of chlorinating agent required is generally increased if any significant amount of water is present on the catalyst so that substantially anhydrous conditions preferably are maintained as regards the catalyst as well as the chlorinating agent. When a promoter is used it is generally supplied in the amount of about 1–5 or 10 percent or more, preferably about 2–3 percent, based on the weight of the catalyst for good metals removal. The chlorine and promoter may be supplied individually or as a mixture to a poisoned catalyst. Such a mixture may contain about 0.1 to 50 parts chlorine per part of promoter, preferably about 1–10 parts per part of promoter. A chlorinating gas comprising about 0.5–25 weight percent chlorine, based on the catalyst, together with one percent or more $S_2Cl_2$ gives good results. Preferably, such a gas provides 1–10 percent $Cl_2$ and about 1.5 percent $S_2Cl_2$, based on the catalyst. A "saturated" mixture of $Cl_2$ and $CCl_4$ can be made by bubbling chlorine gas at room temperature through a vessel containing $CCl_4$; such a mixture generally contains about 1 part $CCl_4$:5–10 parts $Cl_2$.

To remove nickel chloride from the catalyst after chlorination, the catalyst may be washed in a liquid aqueous medium, preferably after the catalyst is cooled to avoid the use of excessive pressures to maintain the liquid phase. The catalyst may be quite sensitive to HCl formed in the treatment, so that several precautions should be observed in the aqueous liquid washing. A great excess of water can be used, for instance sufficient to give a slurry containing only minor amounts of solids, say about 2–20%. Also, the catalyst should not be allowed to remain in this slurry for too long a time, ordinarily not more than 5 minutes; a residence time of 2–3 minutes in the original wash water is generally preferred.

The water used may be distilled or deionized prior to contact with the chlorinated catalyst. However, the aqueous medium can contain extraneous ingredients in trace amounts so long as the medium is essentially water and the extraneous ingredients do not interfere with demetallization or adversely affect the properties of the catalyst. Temperatures above 212° F. and elevated pressures may be used but the results do not seem to justify the added equipment. Contact with the hot catalyst may be sufficient to raise the temperature of the water from ambient temperature to around the boiling point. The aqueous liquid is preferably acid and a weakly acid condition may be obtained by the chlorides generally present in a chlorinated catalyst which has not been purged too severely.

After the wash the slurry can be filtered to give a filter cake which may be reslurried with more water or rinsed in other ways, such as, for example, by a water wash on the filter, and the rinsing may be repeated, if desired, several times. The catalyst is then conducted to a conversion system, although it may be desirable first to dry the catalyst filter cake or filter cake slurry at say 250 to 450° F. and also prior to reusing the catalyst in the conversion operation it can be calcined as in air, say at temperatures usually in the range of about 700 to 1300° F., conveniently by addition to the cracking unit catalyst regenerator. Prolonged treatment with an oxygen-containing gas at above about 1100° F. may sometimes be disadvantageous. Calcination removes free water, if any is present, and perhaps some but not all of the combined water and leaves the catalyst in an active state without undue sintering of its surface.

The catalyst to be treated may be removed before or after the conventional oxidation regeneration which serves to remove carbonaceous deposits. Preferably, the catalyst is drawn from the conversion system after at least partial regeneration, for instance when containing not more than about 5.0% carbon, advantageously not more than about 0.5%. After removing the catalyst from the conversion system, subjecting the poisoned catalyst sample to magnetic flux may be found desirable to remove any tramp iron particles which may have become mixed with the catalyst.

In practicing one embodiment of this invention at the refinery, a portion of the poisoned catalyst is removed from the hydrocarbon conversion system after being regenerated, is subjected to hydrogen at an elevated temperature, then chlorinated in the temperature range outlined and contacted with an aqueous medium to remove soluble or dispersible poisoning metal compounds. The frequency of treatment and the fraction of catalyst inventory treated will be dependent on the severity of the metal problem at the unit in question. The treated catalyst, usually after calcination, can be returned to the unit as make-up catalyst, reducing greatly the new catalyst requirement. Any given step in the demetallization treatment is usually continued for a time sufficient to effect a substantial conversion or removal of poisoning metal and ultimately results in a substantial increase in metals removal compared with that which would have been removed if the particular step had not been performed. The actual time or extent of treating depends on various factors and is controlled by the operator according to the situation he faces, e.g., the extent of metals content in the feed, the level of conversion unit tolerance for poison, the sensitivity of the particular catalyst toward a particular phase of the demetallization procedure, etc.

*Example*

The following example is illustrative of the invention but should not be considered limiting. Analyses used were obtained by X-ray fluorescence.

An "Aerocat" synthetic gel silica-alumina fluid type cracking catalyst composed of about 13% $Al_2O_3$, substantially the rest $SiO_2$, was used in a commercial catalytic cracking conversion unit, using conventional fluidized catalyst techniques, including cracking and air regeneration to convert feedstock (A) comprising a blend of Wyoming and Mid-Continent gas oils containing 1.0 p.p.m. Fe, 0.3 p.p.m. NiO, 1.2 p.p.m. $V_2O_5$ and about 2 weight percent sulfur This gas oil blend had a gravity (API) of 24°, a carbon residue of about 0.3 weight percent and a boiling range of about 500–1000° F. When this catalyst has the poisoning metals content of 245 p.p.m. NiO, 2300 p.p.m. $V_2O_5$ and 0.325% Fe, a sample of the catalyst is removed from the cracking system after regeneration. A 42.9 gram batch of this catalyst, sample 1 is used to test-crack a petroleum hydrocarbon East Texas gas oil fraction (feedstock B) having the following approximate characteristics:

| | |
|---|---|
| IBP (° F.) | 490–510 |
| 10% (° F.) | 530–550 |
| 50% (° F.) | 580–600 |
| 90% (° F.) | 650–670 |
| EP (° F.) | 690–710 |
| Gravity (API) | 33–35° |
| Viscosity (SUS) at 100° F. | 40–45 |
| Aniline point (° F.) | 170–175 |
| Pour point (° F.) | 35–40 |
| Sulfur (percent) | 0.3 |

The results of this cracking are given in Table I below.

A portion (2) of this base catalyst is contacted with $H_2$ at 1200° F. for 3 hours. Chlorination is performed on the hydrogenated catalyst by contacting it with a flowing mixture of $Cl_2$ and $CCl_4$ for an hour at about 600° F. After a quick wash the catalyst is dried and analyzes as 168 p.p.m. NiO, 2,150 p.p.m. $V_2O_5$ and 0.320% Fe, a reduction of 31% nickel. This sample is passed to test cracking of feedstock B with the results reported in Table I. In the following table, R.A. stands for relative activity; D+L, for distillate plus loss, a measure of conversion to lowerboiling components; G.F., for gas factor; C.F., for coke factor; and HPF, for hydrogen producing factor.

TABLE

| Sample | R.A. | D+L | G.F. | Gas grav. | HPF |
|---|---|---|---|---|---|
| 1 | 27.7 | 29.0 | 1.65 | 1.12 | 130 |
| 2 | 30.6 | 30.7 | 1.37 | 1.32 | 94 |

These results show the effectiveness of the hydrogenation and moderate temperature chlorination in removing nickel poison from a catalyst with the subsequent improvement in conversion results thereby obtained.

It is claimed:

1. A method for removing nickel from a synthetic gel, silica-based cracking catalyst which has been poisoned by contamination with nickel due to use of said catalyst in cracking at elevated temperature, to produce gasoline, a hydrocarbon feedstock containing nickel, said cracking including a catalytic cracking zone and a catalyst regeneration zone between which the catalyst is cycled and in which cracking zone the catalyst becomes contaminated with nickel of said hydrocarbon feedstock and in which regeneration zone carbon is oxidized at an elevated temperature and thereby removed from the catalyst, the steps comprising bleeding a portion of the nickel-contaminated catalyst from the cracking system, contacting bled catalyst with hydrogen at a temperature of about 1000–1600° F. to enhance nickel removal from the catalyst, chlorinating the nickel-contaminated hydrogen-treated catalyst by contact with an essentially anhydrous chlorinating agent at a temperature of up to about 1000° F. to convert nickel on the catalyst to a form removable by an aqueous medium, washing the catalyst with a liquid essentially aqueous medium to remove nickel from the catalyst, and conducting resulting denickelized catalyst to a hydrocarbon cracking system.

2. The method of claim 1 in which the hydrogen is essentially anhydrous.

3. The method of claim 1 in which the chlorination is at a temperature of about 550–650° F.

4. The method of claim 1 in which the hydrogen treatment is at a temperature of about 1200–1400° F.

5. The method of claim 4 in which the chlorinating agent is molecular chlorine.

6. The method of claim 1 in which the catalyst is a silica-alumina catalyst.

References Cited by the Examiner
UNITED STATES PATENTS

| | | | |
|---|---|---|---|
| 2,380,731 | 7/1945 | Drake et al. | 252—413 |
| 2,481,253 | 9/1949 | Snyder | 252—415 |
| 2,488,718 | 11/1949 | Forrester | 252—415 |
| 2,488,744 | 11/1949 | Snyder | 252—415 |
| 3,122,512 | 2/1964 | Foster et al. | 252—415 |

MAURICE A. BRINDISI, *Primary Examiner.*